(12) United States Patent
Kupferman

(10) Patent No.: US 6,687,073 B1
(45) Date of Patent: Feb. 3, 2004

(54) METHOD OF SIMULTANEOUSLY WRITING SERVO TRACKS ON A HARD DISK DRIVE

(75) Inventor: Hanan Kupferman, Diamond Bar, CA (US)

(73) Assignee: Western Digital Technologies, Inc., Lake Forest, CA (US)

(*) Notice: Subject to any disclaimer, the term of this patent is extended or adjusted under 35 U.S.C. 154(b) by 264 days.

(21) Appl. No.: 09/944,886

(22) Filed: Aug. 31, 2001

(51) Int. Cl.$^7$ .................... G11B 15/12; G11B 21/02
(52) U.S. Cl. .................... 360/63; 360/75; 360/77.08
(58) Field of Search .................... 360/63, 75, 77.08

(56) References Cited

U.S. PATENT DOCUMENTS 6,078,447 A * 6/2000 Sim .................... 360/48
6,262,859 B1 * 7/2001 Cho .................... 360/77.08
6,525,892 B1 * 2/2003 Dunbar et al. .................... 360/31

* cited by examiner

Primary Examiner—Regina N. Holder
Assistant Examiner—Varsha A. Kapadia
(74) Attorney, Agent, or Firm—Milad G. Shara, Esq.; Knobbe Martens Olson & Bear

(57) ABSTRACT

A method of writing servo tracks on the disk surfaces of a hard disk drive. The method involves simultaneously writing partial servo tracks, called servo wedges, until a complete first set of servo wedges is written on all the disk surfaces. Then the disks are rotated until the heads of the disk drive are correctly positioned to simultaneously write subsequent servo wedge sets. This process is repeated until enough servo wedge sets are written to complete a first servo track on all the disk surfaces. Then, the heads are pivoted to a new radial position to begin writing a new servo track just as before. Simultaneously writing servo wedges advantageously expedites the often costly servo writing process.

15 Claims, 7 Drawing Sheets

METHOD OF SIMULTANEOUSLY WRITING SERVO TRACKS ON A HARD DISK DRIVE

BACKGROUND OF THE INVENTION

1. Field of the Invention

The invention relates generally to a read/write head positioning system used in magnetic data storage devices, such as computer hard drives, and, more specifically, to a method of marking servo tracks in a way that expedites the servo writing process.

2. Description of the Related Art

Hard disk drives are commonly available memory storage devices. The typical hard disk drive includes a plurality of disks having surfaces of magnetic media that are rotating at high speeds about a spindle. A plurality of pivotable head assemblies are mounted with respect to the disk surfaces such that the combination of the rotation of the disks and the pivoting of the head assemblies allow a transducer or head to be positioned adjacent substantially all of the surface of the disk upon which data can be recorded.

Data is typically recorded by inducing the head to produce an electromagnetic field when in proximity to the disk surface so as to change the magnetic state of the disk. Typically, the head is positioned at a particular radial location and data is recorded in a generally circular data track. Similarly, when previously recorded data is being retrieved from the disk surface, the head is positioned adjacent the disk at the radial location containing the data, and the changing magnetic state of the disk surface is then detected by the head.

Increasingly, data tracks are being positioned closer and closer together so as to increase the amount of data that can be stored on a disk surface. In some implementations, the density of data tracks can be 35,000 tracks per inch or higher. As such, it is necessary for the control system of the hard drive to be able to identify the track and the region of the track that the head is positioned adjacent.

More specifically, as data tracks are positioned very close together, it is necessary for hard drive to be able to determine the location of the heads to ensure that the heads are properly positioned with respect to data tracks in order to write and read data to and from the appropriate track. To accomplish this, the magnetic media is also programmed to have servo tracks that provide servo signals to a servo control system that provides information as to the relative position between the heads and the tracks of the hard disks.

Servo tracks are typically arranged into concentric circles positioned around the middle of the disk at a multitude of radii. In an embedded servo system, these servo tracks are split into "wedges" spaced apart circumferentially at regular intervals. The hard disk manufacturer usually writes the servo tracks using a servo writer machine before any data tracks are written. Data tracks are subsequently written onto open areas on the disk surface adjacent the servo wedges such that the servo control system can determine the location of the head with respect to the data track from the positional information contained in the servo track.

Thus, in the typical embedded servo system, the head reads the servo track as it reads data, and the relation between an individual servo track and an individual data track allows the controller to calculate a position error signal (PES) and provide a correction current to the actuator. The correction current pivots the actuator in order to maintain the head's position over the desired track. Servo wedges are also detected during seek operations to monitor the location of the head when moving between tracks.

The servo wedges are written on the disk surfaces during the manufacturing process of the hard disk drive. Typically, the hard disk drive is positioned within a servo writing machine that then induces the disks to rotate and signals are sent to the head at appropriate intervals to record the servo wedges on the disk surfaces. In general, servo writing is a time consuming process that can take up to 10 hours to write all of the servo wedges on all of the servo tracks for a single drive. As such, servo writing comprises a significant portion of the time and cost to produce a hard drive.

Servo wedges can be written one wedge at a time, however, this is particularly time consuming and adds to the time and cost to fabricate the hard drive. Moreover, writing wedges,one at a time may result in the a set of wedges not being written before the servo disks: have rotated to the next circumferential wedge location. As such, writing wedges one at a time may require that the servo writer permit the wedges to rotate to the desired position without writing wedges during this period. This can further reduce the throughput of the servo writing process.

Various techniques have been used in order to expedite the servo writing process. For example, servo writers often implement a bank writing process whereby all the heads of the servo drive are simultaneously provided current to write servo wedges. Since the heads are typically coupled together, they are all positioned at a corresponding radial and circumferential position on the different disk surfaces. Consequently, an entire bank of servo wedges can thus be written on the plurality of disk surfaces. This process can be repeated circumferentially about a servo track for each of the servo wedges of the track until the track is completed. The actuator can move the heads to a different radial position and then repeat this process for each of the servo tracks of the disk surfaces.

While bank writing expedites the servo writing process, improvements in magnetic media have begun to limit the ability of the hard disk drive manufacturers to simultaneously write entire banks of servo wedges at one time. As is understood, to write a servo wedge, current must be sourced to each of the heads writing the wedge. The amount of current needed is, of course, dependent upon the magnitude of the magnetic field needed to be produced by the head to magnetically record the servo wedge of the disk surface.

Increasingly, the magnetic media being used to fabricate the disk surface is less sensitive to magnetic fields and, consequently, stronger magnetic fields have to be generated by the head in order to write the servo wedges. However, since the head assembly and head electronics that are being built into the disk drive are being used to write the servo wedges, the ability to source these greater currents are limited by the current carrying limitations within the head electronics.

To reduce both the cost of the disk drive and the size, the electronics, such as the pre-amp typically have design constraints directed towards normal operation of the hard disk drive, e.g., only single write and read steps being performed at a time. These types of head electronics are therefore less able to handle the simultaneous application of large servo wedge writing currents being sourced to multiple heads. Consequently, the servo writing process is becoming a greater manufacturing bottleneck thereby increasing the overall cost of the hard disk drive.

Hence, there is a need for an improved process of servo writing that allows for greater throughput in the servo writing process. To this end, there is a need for a servo writing process that allows for faster servo writing even with new magnetic media that require higher amplitude magnetic fields to write the servo wedges.

SUMMARY OF THE INVENTION

The aforementioned needs are satisfied by the method of writing servo tracks of the present invention, which involves simultaneously writing portions of servo tracks to thereby expedite the servo writing process.

In one aspect the method involves writing a plurality of servo tracks (x) each having a number of servo wedges on a plurality of disk surfaces. The corresponding servo wedges on each of the plurality of disk surfaces comprise a servo wedge set (z). A first step of the method comprises writing a subset (y) of a servo wedge set (z) for a servo track (x) on a subset of the disk surfaces such that the subset (y) is being written at one time. Then, a second step begins upon completion of the first step, wherein the next subset (y) of the servo wedge set (z) on the next subset of disk surfaces is written such that the next subset (y) is being written at one time. Next, a third step involves repeating, if necessary, the first two steps until all of the servo wedges of the servo wedge set (z) have been written. In step four, the next servo wedge set (z) is moved to. Then, following step four, step five begins in which steps one through three are repeated until all of the servo wedges of the next servo wedge set (z) have been written. Subsequently, in step six, steps four and five are repeated until all of the servo wedge sets (z) of the servo track (x) have been written. Next, following step six, step seven involves moving to the next servo track (x). Step eight requires that steps one through six are repeated, if necessary, for the next servo track (x). Finally, step nine involves repeating acts seven and eight, if necessary, for each servo track (x).

Another aspect of the method involves writing servo tracks comprised of circumferentially spaced servo wedges at a plurality of radial locations on a hard drive having a plurality of disk surfaces and read write heads. The method comprises a first step in which a first group of the read write heads of the hard drive are enabled so as to simultaneously write a corresponding first subset of the servo wedges on a corresponding first set of disk surfaces. The first subset of servo wedges are at a corresponding first circumferential location on an individual radial servo track. Then, step two involves disabling the group of heads previously enabled. Step three of the method comprises enabling a next group of read write heads of the hard drive so as to simultaneously write a next subset of the servo wedges on a next set of corresponding disk surfaces. The next subset of servo wedges correspond to the first subset of servo wedges written in step one. Next, in step four, the group of heads previously enabled are disabled. In step five, steps three and four are repeated, if necessary, until a first wedge set has been written. The first wedge set comprises a plurality of corresponding subsets of servo wedges, and the subsets of servo wedges of the typical wedge set are circumferentially spaced from each other along the first radial servo track by a stagger distance. Following step five, step six begins and in which the first group of read write heads of the hard drive are enabled so as to simultaneously write a first subset of the servo wedges of the next wedge set on the first set of corresponding disk surfaces. In step seven, the groups of heads previously enabled in step six are disabled. After step seven, step eight involves enabling the next group of the read write heads of the hard drive so as to simultaneously write the next corresponding subset of servo wedges on the next set of disk surfaces wherein the next corresponding subset of servo wedges fall into the same wedge set affected in step six. In step nine, the group of heads enabled in step eight are disabled. Then, in step ten, steps eight and nine are repeated, if necessary, until a next wedge set has been written. Step eleven comprises repeating, if necessary, steps six through ten for each of the remaining wedge sets on the radial servo track affected in step one. Finally, step twelve comprises repeating, if necessary, steps one through eleven for each of the remaining servo tracks of the plurality of disk surfaces.

In another aspect the method involves writing servo tracks on a hard drive having a plurality of disk surfaces and read write heads, and each disk surface comprises a plurality of servo tracks at a plurality of radial locations. A particular servo track is represented by the variable X, and typical servo track comprises a plurality of servo wedges. The servo wedges are grouped so as to define wedge sets, and a particular wedge set is represented by the variable Z. Each wedge set comprises a plurality of subsets, and a subset comprises at least two servo wedges but less than the total number of servo wedges in the corresponding wedge set. A particular subset is represented by the variable Y. A first step of the method involves setting X, Y, and Z to an initial value. Then, in step two, the heads are positioned to the radial location of the $X^{th}$ servo track. Next, in step three, a plurality of heads are enabled to write the $Y^{th}$ subset of the $Z^{th}$ wedge set. The method continues in step four in which the plurality of heads previously engaged in step three are disabled. Step five of the method involves incrementing Y to correspond to the next subset of the $Z^{th}$ wedge set. Next, in step six, steps three through five are repeated, if necessary, until the $Z^{th}$ wedge set is complete. Following step six, step seven begins in which Y is reset to equal the initial value. In step eight of the method, Z is incremented to correspond to the next wedge set. Step nine involves repeating steps three through eight, if necessary, until the $X^{th}$ servo track is complete. Step ten follows step nine, and step ten comprises incrementing X to correspond to the next servo track. Then, in step eleven, Y and Z are reset to the initial value. Finally, in step twelve, steps two through eleven are repeated, if necessary, until the plurality of servo tracks are complete.

Servo writing is often a time consuming process, and manufacturers often cannot afford enough servo writing machines to maximize throughput. As stated, this method involves writing multiple servo wedges simultaneously. Simultaneous writing of servo wedges advantageously expedites the servo writing process and throughput is increased as a result, which likely leads to cost savings.

DETAILED DESCRIPTION OF THE PREFERRED EMBODIMENT

Figure 1A:
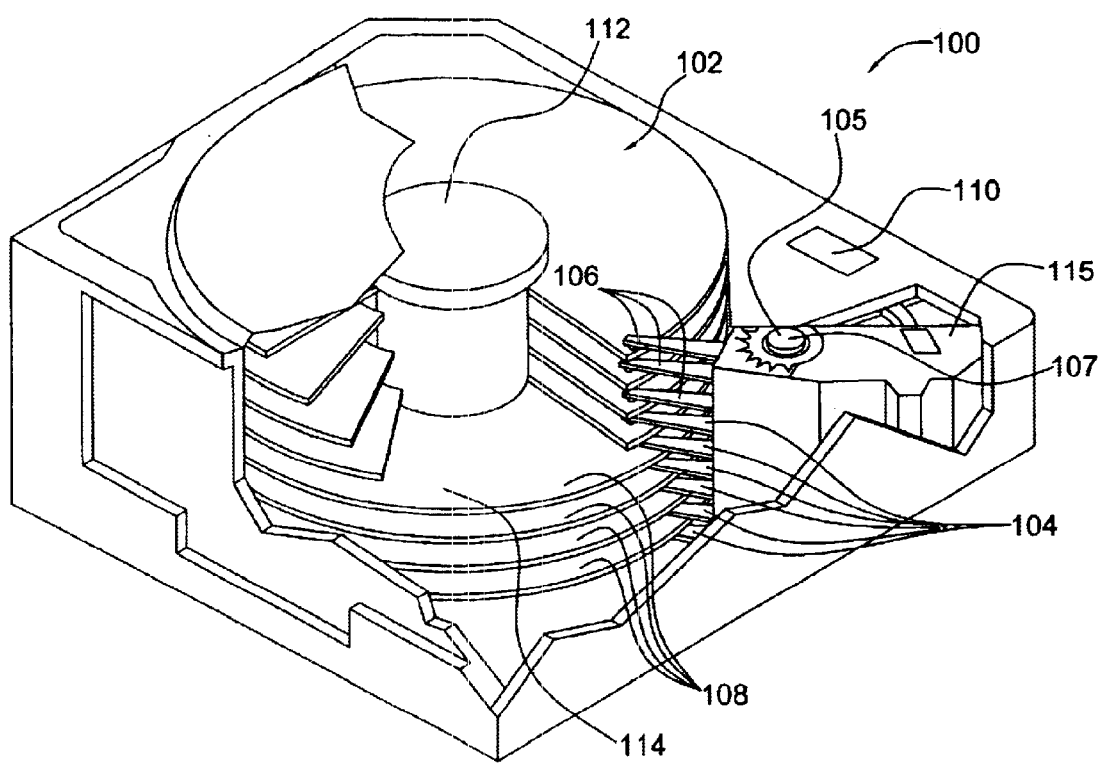
FIG. 1A is a perspective view of one embodiment a typical hard disk drive.
Figure 1B:
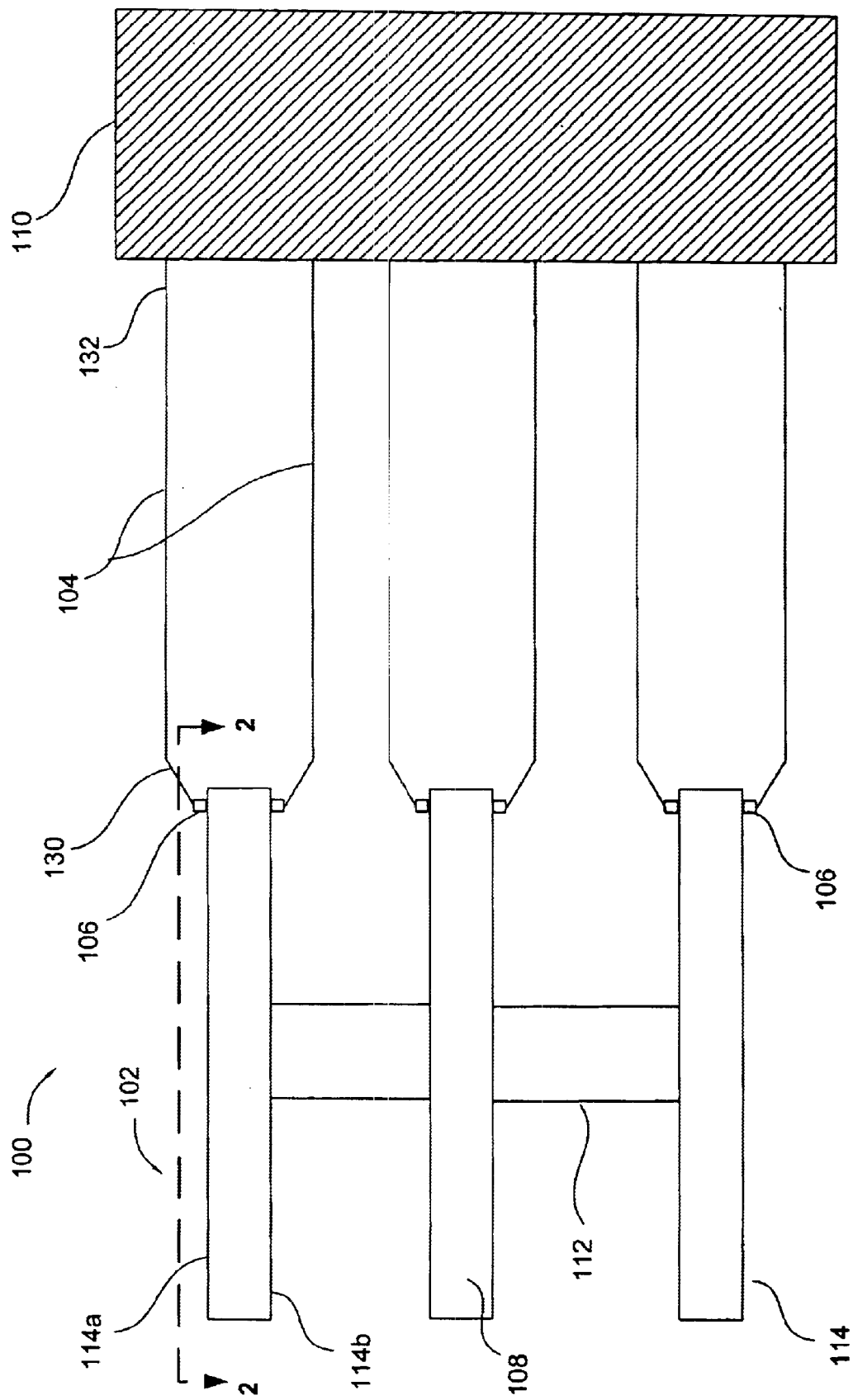
FIG. 1B is a schematic view of the hard disk drive similar to the drive shown in FIG. 1A.

FIG. 1A and FIG. 1B illustrate one embodiment of a hard disk drive 100 and its component parts. Some basic components of the disk drive 100 comprise a disk array 102, a plurality of armatures 104, each comprising a corresponding head 106, and a control system 110. All of these components interact to store and retrieve magnetically encoded data.

As shown in FIGS. 1A and 1B, the disk array 102 comprises a plurality of magnetic disks 108, substantially circular in shape and arranged in a parallel stack about a spindle 112 that induces the disks 108 to rotate. In one embodiment, each disk 108 defines two disk surfaces 114, a top surface 114a and a bottom surface 114b, upon which data and servo tracks may be written. The exact number of disks 108 that are included in the disk drive 100 can, of course, vary depending upon the implementation.

The typical head 106 is positioned at a first end 130 of the armature 104, and the head 106 is preferably positioned such that it lies very close to the disk surface 114. In one embodiment of the hard disk drive 100, there is an armature 104 and a corresponding head 106 for every disk surface 114.

At a second end 132 of the typical armature 104, the individual armatures 104 are attached together so as to be pivotable about a pivot point 105. Typically, each of the armatures 104 are attached so as to be parallel to each other such that each of the armatures 104 and heads 106 are pivoted simultaneously together. An actuator 107 is engaged with the second end of the armature 132 such that the actuator 107 can induce the armatures 104 to pivot over an arc of motion. The arc of motion is preferably selected such that the it covers an entire radial distance of the disk surface 114 such that as the disks 102 are rotating about the spindle 112, all of the disk surfaces 114 containing the data tracks and the servo tracks are accessible by the heads 106.

As is understood, the actuator 107 includes a voice coil motor 115 that, in response to control signals, induces a torque on the armatures 104 so as to induce the armatures 104 to pivot about the pivot point 105. Hence, by application of control signals to the voice coil motor 115, the armatures 104 with the associated read write heads 106 can be moved to any of a plurality of radial locations on the disk surfaces 114 in which data may be stored. The disk drive 100 therefore operates in a manner that is well known in the art.

Figure 2:
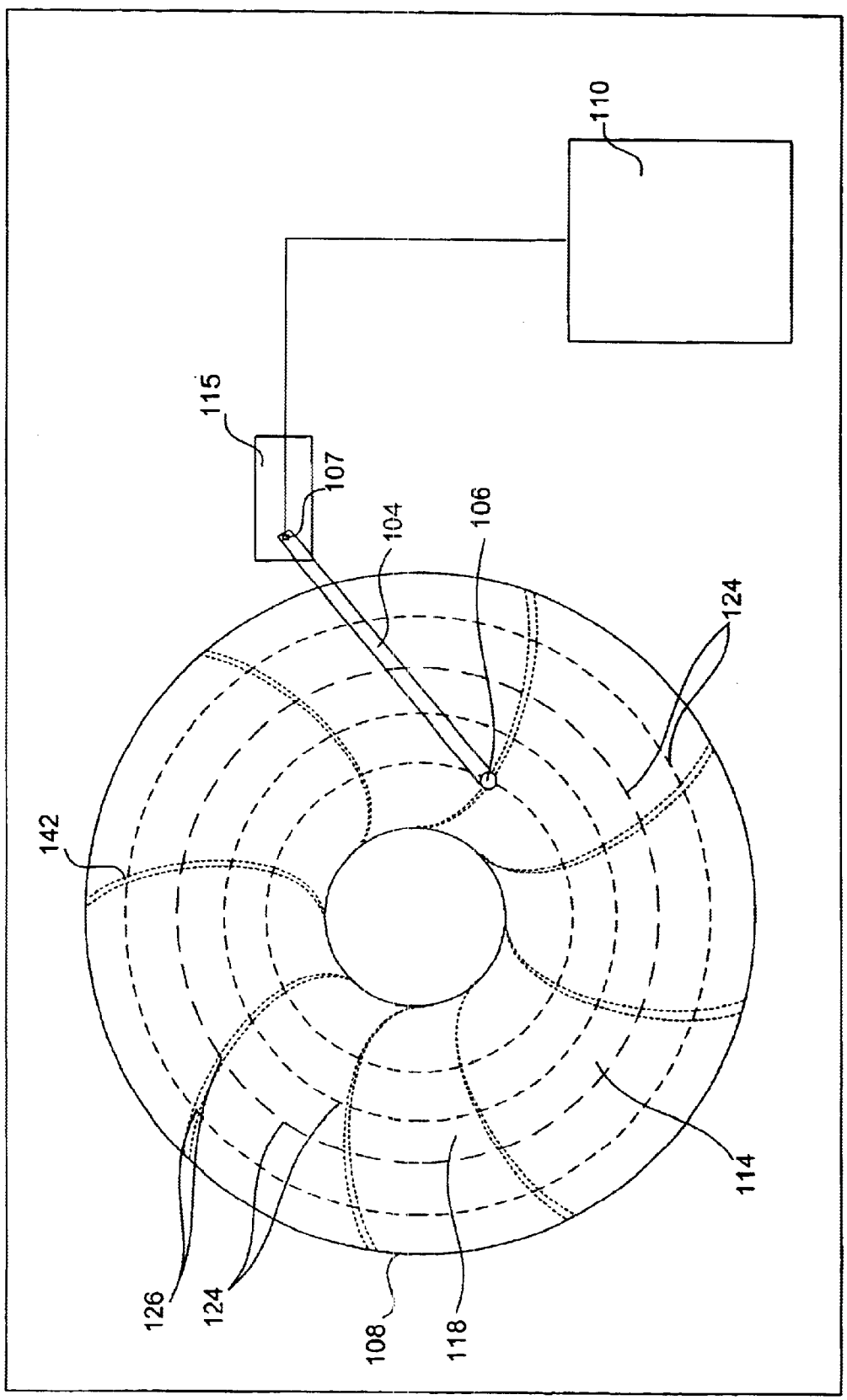
FIG. 2 is an illustration of a typical disk.

FIG. 2 is a simplified example of a surface 114 of the magnetic disk 108. As shown, a plurality of circumferential data tracks 124 are substantially centered around the spindle 112 such that each data track 124 occupies a different radial position. While FIG. 2 illustrates for explanatory purposes only several data tracks, the typical number of data tracks on a disk surface 114 is actually quite large. In one embodiment, the density of the data tracks 124 is 35,000 tracks per radial inch of writable disk surface 114.

As shown, the surface 118 of the disk 108 also comprises a plurality of circumferential servo tracks 126 formed on the disk surface. The servo tracks 126 comprise a plurality of servo wedges 142, which are individual circumferential sections of the circular servo track 124. As is understood, there is typically one servo track 126 for each of the data tracks 124 such that the control unit 110 can receive signals indicative of the location of the head 106 with respect to a particular servo track 126 and corresponding data track 124. The servo wedges 142 are preferably circumferentially spaced about the servo track 124 such that corresponding servo wedges in a first servo track are at a corresponding circumferential position as corresponding servo wedges in a second servo track. As shown in FIG. 2, corresponding servo wedge locations on different tracks are, in arcuate paths. Hence, the servo wedge locations result in a generally pin wheel shaped pattern as is illustrated in FIG. 2. The arcuate paths of the corresponding servo wedge locations is the result in the pivoting movements of the head assemblies over the spinning disk surfaces during the servo writing process which define the arcuate paths illustrated.

Typically, there are multiple servo wedges 142 per servo track and, in one implementation, there are 64 servo wedges 142 per servo track 124. Hence, the total number of servo wedges 142 that must be written on each disk surface during servo writing can be very large, e.g., over 2 million servo wedges per inch of disk surface for a disk having a track density in the range of 30,000 to 40,000 tracks per inch. This number is, of course, multiplied by each of the disk surfaces in the hard drive 100. Hence, during the servo writing process when these servo wedges are written many millions of servo wedges 142 will have to be written which creates the manufacturing bottleneck discussed above.

As mentioned above, during the servo writing process, the spindle 112 is turned at a high rate of speed, causing the disks 108 to rotate. Then the control system 110 sends an electronic signal to one or more selected heads 106, inducing the selected heads 106 to produce an electromagnetic signal, which magnetically encodes the disk surface 114 with the servo wedge 142. As discussed above, new magnetic media being used in the disk surfaces 114 has limited the number of servo wedges that can be written at any one time. Given the large number of wedges 142 that must be written, the preferred implementation of servo writing described herein is configured to increase the throughput of the servo writing process such that the servo writing process can be efficiently performed given the physical limitations of the disk drive system 100.

Figure 3:
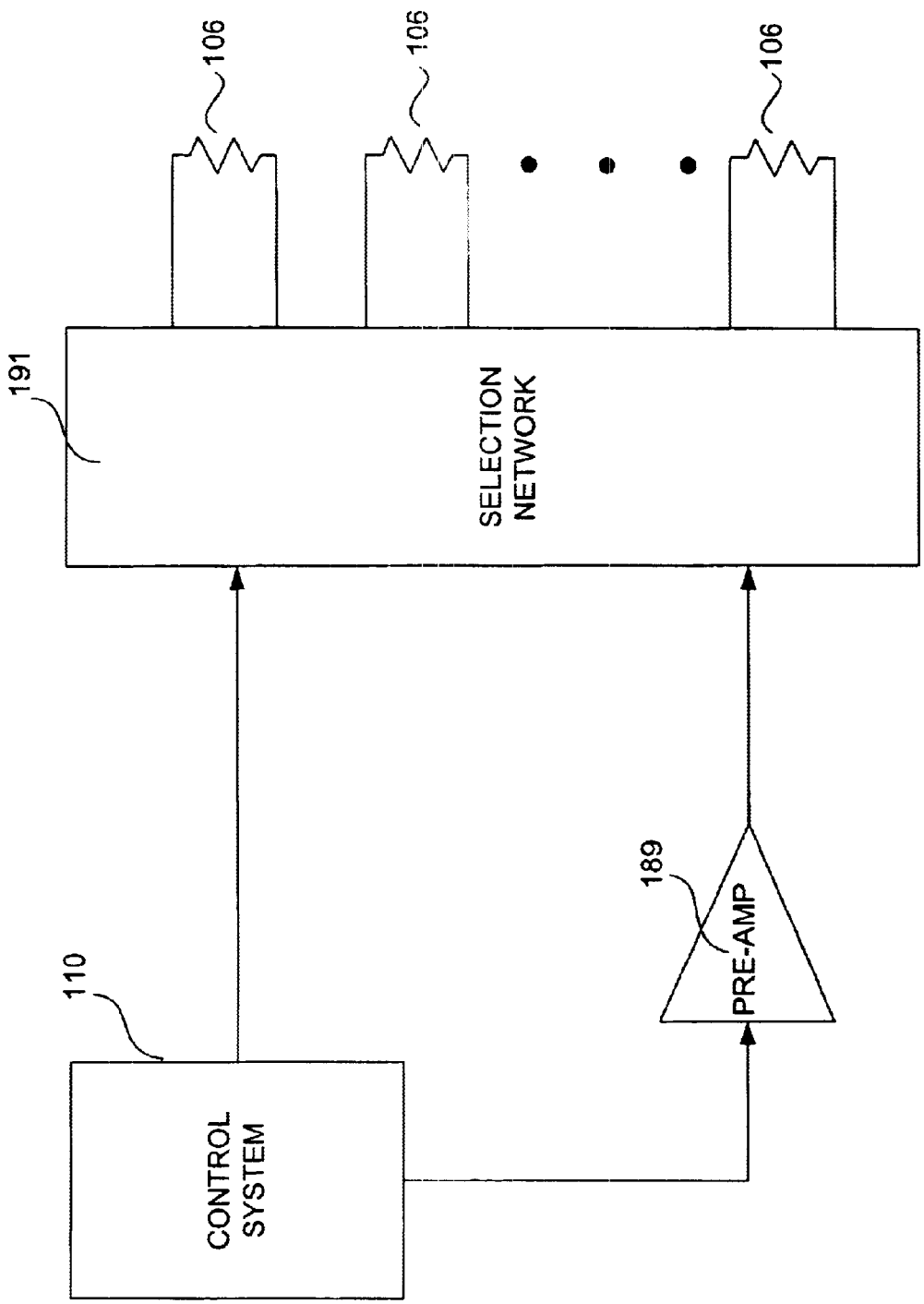
FIG. 3 is a schematic block diagram illustrating the servo writing process.

As is schematically illustrated in FIG. 3, servo writing is accomplished by inducing the control system 110 to send signals to the heads 106 at pre-selected intervals to write the servo wedges 142. Typically, the signals 106 are provided via a pre-amplifier 189 such as a VM7240 pre-amp manufactured by Agere Systems of Allentown, Pa. The pre-amplifier 189, however, is typically limited to providing sufficient current to write a small number of the servo wedges 142 at one time. As will be described in greater detail below, the control system 110 is preferably configured to write a subset of a bank of servo wedges simultaneously. As is discussed above, each of the disk surfaces 1114 have servo wedges written at corresponding circumferential and radial locations. When the actuator 107 has moved the heads 106 into a selected position to write one or more servo wedges 142 on different disk surfaces, the heads 106 are all positioned at the same circumferential and radial location, e.g., at the same bank of possible servo wedge locations.

However, the pre-amplifier 189 is not able to source the current needed to simultaneously induce each of the plurality of heads 106 to write the bank of servo wedges at one time. Consequently, a logical selection network 191 is implemented so as to be able to sequentially select the subset of heads 106 to receive current to write the subset of servo wedges 142. The logical selection network 191 can either be a software implementation or a hardware multiplexer device.

Figure 4:
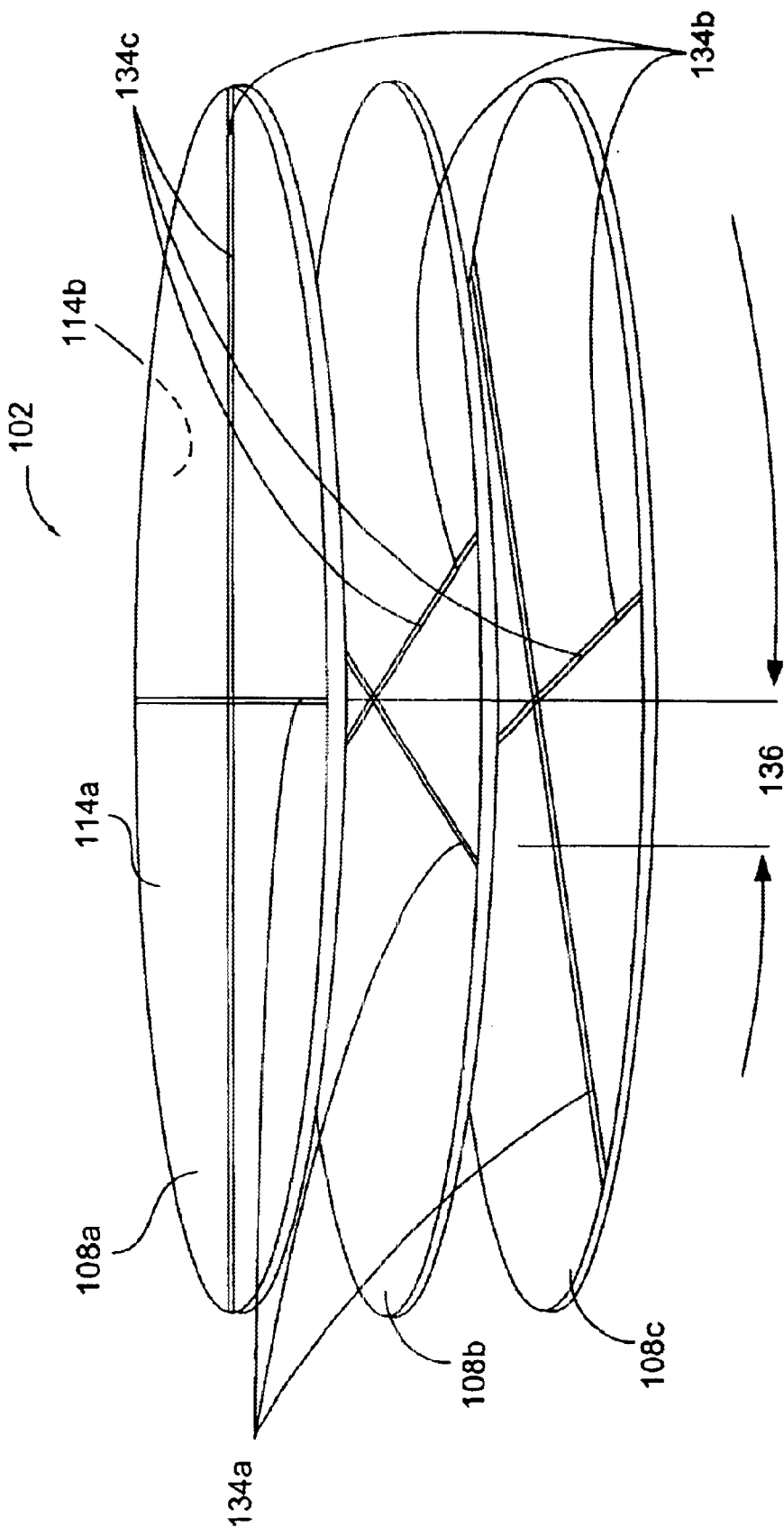
FIG. 4 is a perspective view of a plurality of hard disks each comprising a plurality of servo tracks.

Turning now to FIG. 4, an exemplary disk array 102 is shown with servo wedges 142 written upon the disk surfaces 114. As shown, the servo wedges 142 of each disk 108 are grouped so as to define a wedge set or bank 134a, 134b, 134c. The typical wedge set 134a, 134b, 134c comprises all the servo wedges 142 on the disk surfaces 114 located at approximately the same radial distance and clocked circumferentially offset from each other by a stagger distance 136. As is understood, the servo wedges 142 in every servo track 126 are generally numbered, e.g., 1–64. Hence, on each disk surface, there are corresponding servo tracks 126 and corresponding servo wedges 142. The exemplary wedge sets 134a, 134b, 134c are thus comprised of servo wedges 142 that correspond to each other e.g., the set of servo wedge no. 1 on a particular servo track 126 on each of the disk surfaces 102. Thus, in the example shown, the wedge set 134a comprises six servo wedges 142 (three being on the illustrated upper surface 114a of the disks 102 in FIG. 4 and three being on the unillustrated bottom surface). The stagger distance 136 is an effect of the servo writing process that will be explained in greater detail below. (For clarity, the wedge set 134 will hereinafter be referred to in general terms instead of differentiating the wedge sets 134a, 134b, 134c.)

Figure 5:
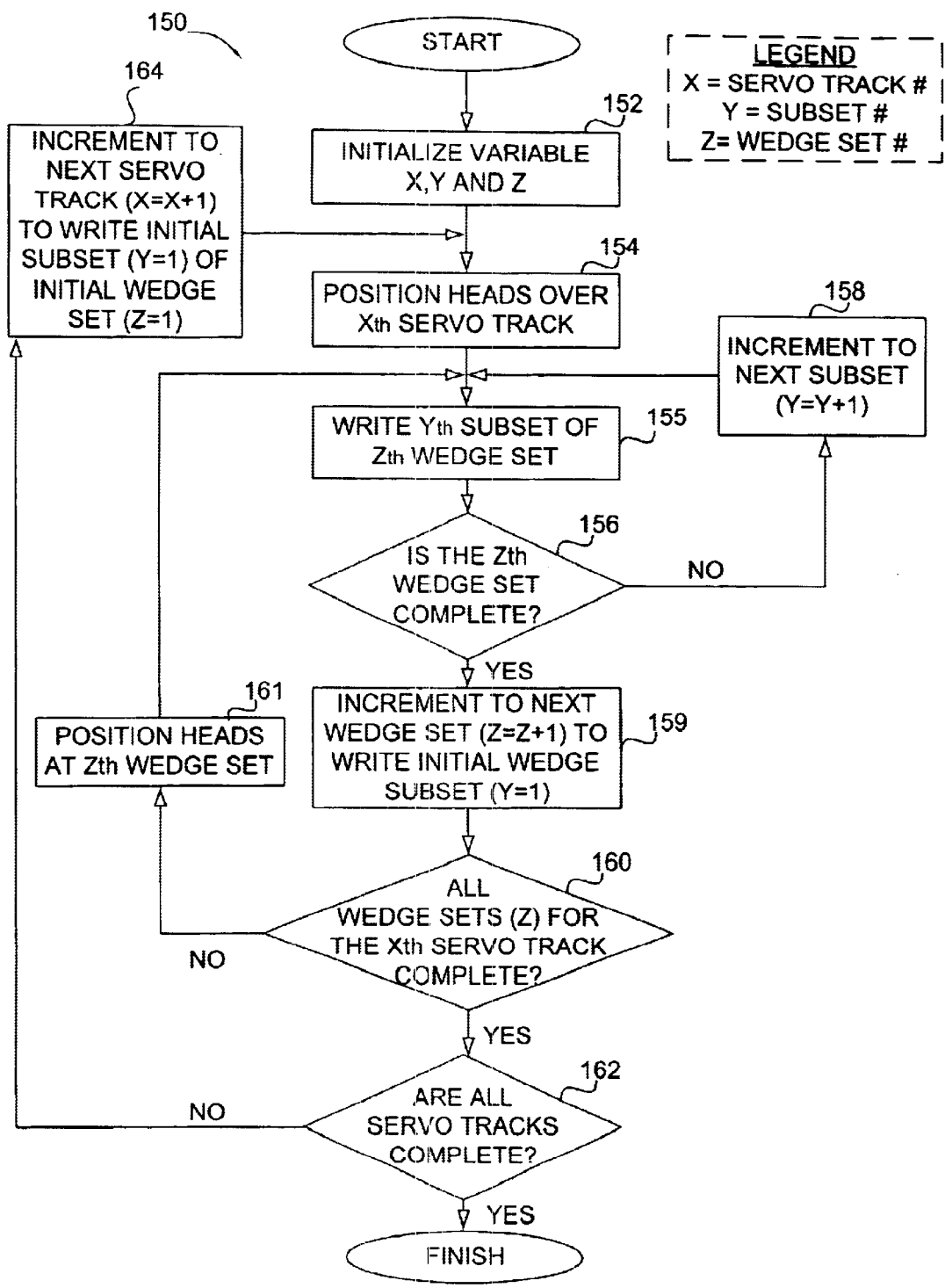
FIG. 5 is a flow chart illustrating one embodiment of the process of writing servo tracks on a typical hard disk drive.

FIG. 5 is a simplified flow chart illustrating one embodiment of a preferred process 150 used in the servo writing process. In one embodiment, this process 150 is used to generate an algorithm that the control unit 110 will run during the servo writing process. It will be appreciated that any of a number of different variables, values, input signals, and output signals can be included in the process 150 without departing from the spirit of the invention. Hence, the embodiment contained in the flow chart of FIG. 5 is simply exemplary of the basic operational process of the method 150 of writing servo tracks 126.

Initially, the control system 110 is, in state 152, initialized. More specifically, before writing any servo wedges 142, the control system 110 initializes itself to ensure the predetermined first servo wedge 142 will be written at the predetermined desired location. In the example shown in FIG. 5, three variables, X, Y, and Z, are used and they are all set to an initial value. The X variable represents the set of servo tracks 126 that are being written, the Y variable represents a subset of the wedge set 134 that is being written, which is preferably a plurality of servo wedges less than the wedge set and in one specific implementation is two, and the Z variable represents the wedge set 134 that is being written. As is understood, the servo track set X, comprises the servo tracks 126 at the same radius on each of the surfaces of the disks 102. In one embodiment, setting all three variables equal to the number one initializes the variables.

As will be described in greater detail below, the subsets of the wedge set 134 (represented by the variable Y in this example), corresponds to the number of servo wedges 142 that are being written simultaneously. Multiple servo wedges 128 of a wedge set 134 are written simultaneously in order to advantageously expedite the servo writing process. Preferably, the number of servo wedges 128 being written simultaneously (i.e., the number of servo wedges 128 included in the subset) is maximized according to the electrical limitations of the preamplifier 189.

Advantageously, simultaneous writing of servo wedges 142 allows for a greater throughput in the servo writing process. Moreover, since multiple wedges are being written at a time, the number of wedges being written during each rotation of the disks have also been increased. As such, the likelihood that all of the wedges in a wedge set will be written before the disk rotates to the circumferential location corresponding to the next set of wedges will be reduced. Consequently, the loss of throughput stemming from having to wait for the disks to rotate a complete revolution to the next circumferential location is reduced.

Next, the heads 106, in state 154, are moved into a radial position that coincides with the desired radius of the first servo track 126. In the example shown in FIG. 5, the heads 106 are positioned over the initial $X^{th}$ servo tracks 126 on each of the disk surfaces 114. Therefore, the actuator 107 pivots the armature 104 such that the heads 106 are positioned at this initial radius.

Next, the first subset Y of the first wedge set Z is written in state 155. The control system 110 logically selects the heads 106 corresponding to the $Y^{th}$ subset of the $Z^{th}$ wedge set and sends current to the selected heads 106. The heads 106 then generate an electromagnetic signal which magnetically encodes areas of the disk surface 114 with the first servo wedges 142. Therefore, the first subset Y of the first wedge set Z of the first servo track set X is written, after which the signal from the control system 110 is cut off such that the heads 106 cease writing. Since the heads 106 are preferably lined up vertically over their respective disk surface 114, the subset Y written in state 155 should line up approximately at the same radial and circumferential position.

The control system 110 then decides, in decision state 156, whether the current wedge set Z is complete. If not, then, in state 158, the control system 110 prepares to write the next subset Y of the first wedge set Z of the first servo track set X by selecting the next heads 106 corresponding to the next subset Y. In the example shown, state 158 specifically involves incrementing the Y variable by one to correspond to the next subset.

The process comprising the steps 155, 156 and 158 is repeated until the control system decides in decision state that all of the subsets Y of the wedge set Z have been written. Since each servo wedge in a particular subset Y is being written simultaneously, each of these servo wedges will be written at approximately the same radial and circumferential position. However, since the disk surfaces are spinning during the servo writing process and each wedge subset Y is being written sequentially, each of the subsets Y of servo wedges will be circumferentially offset from each other by the circumferential distance traveled by the disks 102 during the delay between writing sequential subsets. This circumferential offset is the stagger distance 136 illustrated in FIG. 4.

Once the control system 110 concludes that a particular wedge set Z has been completed, the control system prepares to write the next wedge set Z. In the example in FIG. 5, the Z value is incremented by one in state 159 to correspond to the next wedge set. Also, in state 159, the Y value is also re-initialized to correspond to the first subset Y of the next wedge set Z+1.

The control system 110 then decides whether the servo track set Z currently being written has all of the necessary wedge sets Z on all of the disk surfaces 114. If the answer is no, then in a state 161, the heads 106 are positioned above the disk surfaces 114 where the next wedge set Z is to be written. It is understood that the disks 102 are continuously rotating and the next wedge set Z is in the same servo track set X. Hence, the control system 110 simply waits until the proper circumferential position of the next wedge set Z is at the heads 106.

When the disks 102 are in their proper position, the process returns to state 155 in order to write the first subset Y of the next wedge set Z of the first servo track set X. Each of the subsets Y of the wedge set Z are then written in the previously described manner in states 155, 156 and 158 until the control system 110 determines in state 156 that the next wedge set Z has been completely written.

This process of steps 154, 155, 156, 158 and 159 is then repeated for each of the wedge sets Z of the servo track set X until the control system 110 determines in decision state 160 that all of the wedge sets Z for the servo track set X have been completed.

The control system 110 then determines, in decision state 162 whether all of the wedge sets Z for all of the servo track set X have been written.

If the all of the wedge sets Z for all of the servo track set X have not been written, the control system then prepares to write the wedge sets Z for the next servo track set X in state 164. In the example of FIG. 5, the control system 110 then increments, in state 164, to the next servo track set X=X+1, and reinitializes to write the first subset Y for the first wedge set Z of the next servo track set X+1.

Subsequently, the actuator moves the heads 106 in state 154 to the next servo track set X+1 and the process comprising the steps 154–161 is repeated until all of the wedge sets Z for the next servo track set X +I has been completed.

Hence, the process comprising the steps 154–162 is then repeated for each of the servo track sets X until the control system decides in decision state 162 that all of the servo wedges on all of the servo tracks have been written at which point the servo writing process has been completed.

Figure 6:
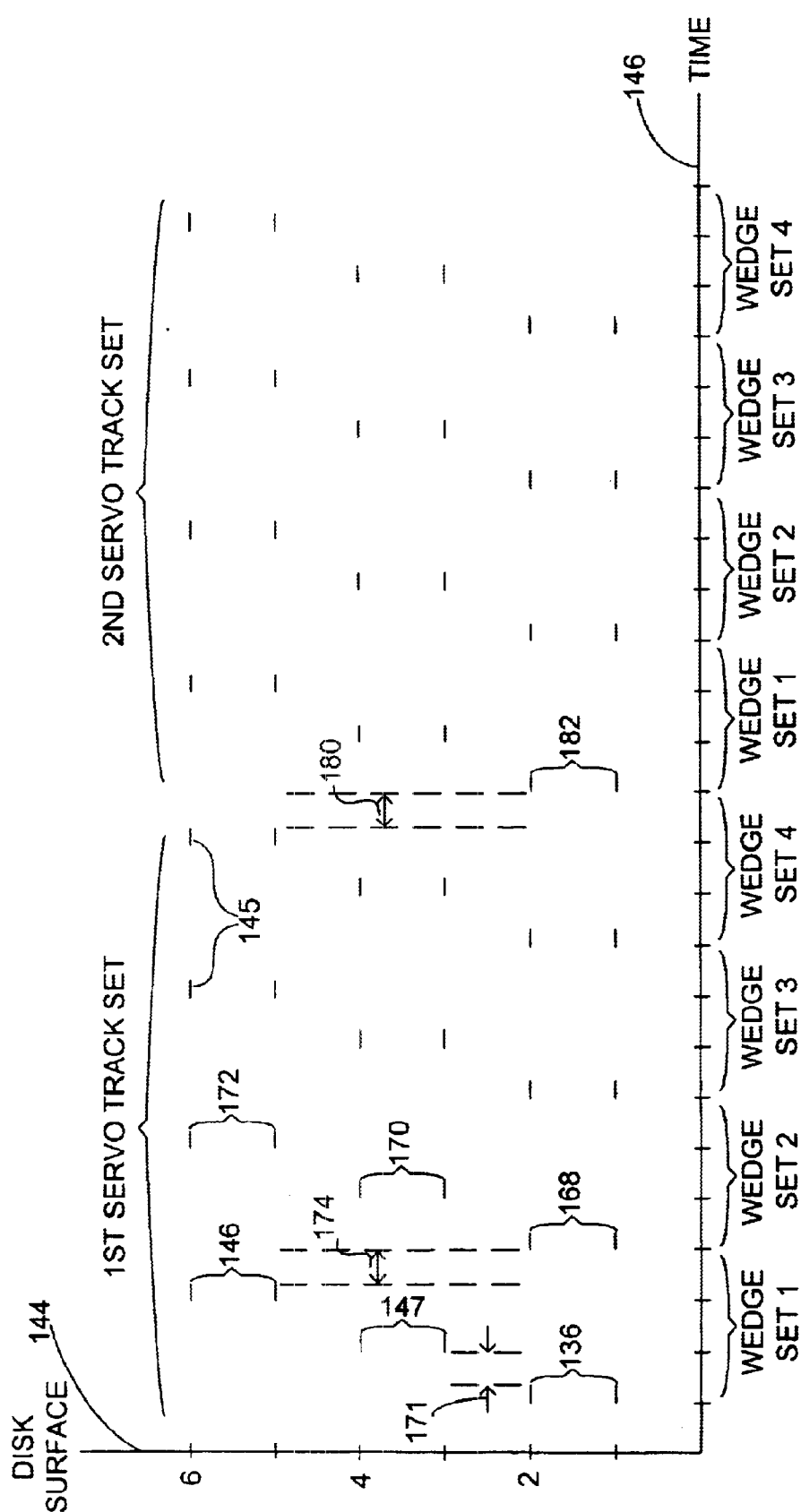
FIG. 6 is a graphical representation of one embodiment of the process of writing servo tracks on a typical hard disk drive.

Turning now to FIG. 6, a simplified example of the process 150 is graphically illustrated. In this simplified example, the disk array 102 of FIG. 4 is servo written. As shown, in FIG. .4 the disk array 102 comprises three disks 108, and each disk 108 defines two surfaces 114 (top and bottom) upon which servo tracks 126 will be written. In this example, two, servo track sets X of six servo tracks 126 each having four servo wedges 142 each will be written. It follows then that the servo tracks 126 in the disk array 102 will each comprise four wedge sets 134; therefore variable Z will range from one to four. In this embodiment, servo wedges 142 will be written two at a time (i.e., two servo wedges 142 define a subset Y of a wedge set 134). Thus, there are three subsets Y in a wedge set Z. In FIG. 6, the six disk surfaces 114 are represented on a vertical axis 144, and servo writing time is represented on a horizontal axis 146.

Referring to FIGS. 4–6, after the control system 110 initializes itself in state 152 and positions the heads 106 over the first servo track 126, two heads 106 are engaged and simultaneously write two servo wedges 142 in state 155 as represented by the bars 138 in FIG. 6. More specifically, two servo wedges 142 located at approximately the same radial and circumferential position are written on the top surface 114a and bottom surface 114b of the top disk 108a in the disk array 102. As stated these first two servo wedges 142 define the first subset Y of servo wedges 142 in the first wedge set Z.

Then, since the first wedge set Z is incomplete, the control system 110 increments to the next subset Y in state 158. Once incremented, two more heads 106 over the middle disk 108b (FIG. 4) in the array 102 are engaged to write the second subset Y of the first wedge set 134 which are represented by the bars 147 in FIG. 6. Since the first wedge set Z is still incomplete, the control system 110 increments to the next subset Y in state 158. Then, two more heads 106 over the bottom disk 108 in the array 102 are engaged to write the third subset Y of the first wedge set Z which are represented by the bars 148 in FIG. 6. As is illustrated in FIG. 6, each of the pairs 138, 147, 148 are separated circumferentially from each other by a stagger distance 171. The stagger distance 171 is representative of the rotation of the disks 102 during the period that the control system 110 is switching the servo writing from the first subset to the second subset and then to the third subset.

The completion of the third subset Y of servo wedges 142 completes the first wedge set Z. However, in this embodiment, three more wedge sets Z remain to be written in order to complete the first servo track 126. Therefore, according to FIG. 5, the control system 1 10 proceeds through state 159, preparing to write the second wedge set Y. Thus, the control system 110 in state 161 waits for the disks 102 to rotate to the circumferential position of the second wedge set Z. An arrow 174 in FIG. 5 represents the time necessary for the disks to rotate in state 161.

This example of the process 150 continues, in state 155, with heads 106 over the top and bottom surface 118 of the top disk 108 engaging to write the first subset 187 of the second wedge set Z, as represented by a fourth pair of bars 168 in FIG. 6. The second and third subsets Y are subsequently written in order to complete the second wedge set Z, as represented by a fifth pair of bars 170 and sixth pair of bars 172 in FIG. 6 in the same, manner as described above.

Next, the third and fourth wedge sets Z are written in order to complete the first servo track 126 on all of the six disk surfaces 114, as represented by a plurality of bars 145 in FIG. 6, i.e., the first servo track set X. Subsequently, the control system 110 reaches decision state 162 and decides that a second servo track 126 remains to be written. Thus, in state 164, the control system 110 prepares to write the next servo track set X by incrementing the X variable. Then, in state 154, the armature 104 is pivoted such that the heads 106 are radially positioned over what will become the second servo track set X. An arrow 180 represents the time required to pivot the armature 104.

Then, just as before, a first through fourth wedge set 134 are written onto the disk surfaces 114 at a radial position corresponding to the second servo track set X. This completes the second and final servo track set X and the servo writing process is complete. Again, FIG. 5 and FIG. 6 represent only one embodiment of the method 150 of writing servo tracks 126. It is understood that programming of the control system 110 could vary significantly (e.g., by increasing the number of servo wedges 142 included in a subset 187) without departing from the spirit of the invention.

As stated, the servo track writing process can be time consuming, and because of cost constraints, manufacturers often do not have enough servo writers to prevent a bottleneck in this servo writing process. The method 150 involves writing servo wedges 142 simultaneously, and preferably, the number of servo wedges 142 written at one time can be maximized according to the electrical limitations of the preamplifier 189. Increasing the number of servo wedges 142 written simultaneously reduces servo track writing time. Therefore, using the method 150, the throughput in the servo writing process is advantageously increased, and manufacturing costs are decreased as a result.

Although the, foregoing description of the preferred embodiment of the present invention has shown, described and pointed out the fundamental novel features of the invention, it will be understood that various omissions, substitutions, and changes in the form of the method may be made by those skilled in the art, without departing from the spirit of the invention. Consequently, the scope of the invention should not be limited to the foregoing discussions, but should be defined by the appended claims.

What is claimed is:

1. A method of writing a set of servo tracks (x) each having a number of servo wedges on a plurality of disk surfaces wherein the corresponding servo wedges on each of the plurality of disk surfaces comprise a servo wedge set (z), the method comprising:

(i) for a servo track set (x) writing a subset (y) comprising a plurality of servo wedges of a servo wedge set (z) on a subset of the disk surfaces such that the subset (y) is being written at one time;

(ii) upon completion of act (i) writing the next subset (y) of the servo wedge set (z) on the next subset of disk surfaces such that the next subset (y) is being written at one time;

(iii) repeating, if necessary, acts (i) and (ii) until all of the servo wedges of the servo wedge set (z) have been written;

(iv) following act (iii) moving to a next servo wedge set (z);

(v) following act (iv) repeating acts (i) through (iii) until all of the servo wedges of the next servo wedge set (z) have been written;

(vi) repeating, if necessary, acts (iv) and (v) until all of the servo wedge sets (z) of the servo track set (x) have been written;

(vii) following act (vi) moving to the next servo track set (x)

(viii) repeating acts (i) through (vi) for the next servo track set (x); and (ix) repeating acts (vii) through (viii) for each servo track set (x).

2. The method of claim 1, wherein the subset (y) comprises a total of two servo wedges.

3. The method of claim 1, wherein the total number of disk surfaces is six.

4. The method of claim 1, wherein the typical disk surface has a servo track density in the range of 30,000 to 40,000 servo tracks per radial inch.

5. The method of claim 1, wherein the number of servo wedges per servo track is 64.

6. A method of writing servo tracks comprised of circumferentially spaced servo wedges at a plurality of radial locations on a hard drive having a plurality of disk surfaces and read write heads, the method comprising:

(i) enabling a first group of the read write heads of the hard drive so as to simultaneously write a corresponding first subset of the servo wedges on a corresponding first set of disk surfaces wherein the first subset of servo wedges are at a corresponding first circumferential location on an individual radial servo track;

(ii) disabling the group of heads previously enabled;

(iii) enabling a next group of read write heads of the hard drive so as to simultaneously write a next subset of the servo wedges on a next set of corresponding disk surfaces wherein the next subset of servo wedges correspond to the first subset of servo wedges written in act (i);

(iv) disabling the group of heads previously enabled;

(v) repeating, if necessary, acts (iii) and (iv) until a first wedge set has been written wherein the first wedge set comprises a plurality of corresponding subsets of servo wedges and wherein the subsets of servo wedges of the typical wedge set are circumferentially spaced from each other along the first radial servo track by a stagger distance;

(vi) following act (v) enabling the first group of the read write heads of the hard drive so as to simultaneously write a first subset of the servo wedges of the next wedge set on the first set of corresponding disk surfaces;

(vii) disabling the group of heads previously enabled;

(viii) following act (vii) enabling the next group of the read write heads of the hard drive so as to simultaneously write the next corresponding subset of servo wedges on the next set of disk surfaces wherein the next corresponding subset of servo wedges fall into the same wedge set affected in act (vi);

(ix) disabling the group of heads previously enabled;

(x) repeating, if necessary, acts (viii) and (ix) until a next wedge set has been written;

(xi) repeating, if necessary, acts (vi) through (x) for each of the remaining wedge sets on the radial servo track affected in act (i); and (xii) repeating, if necessary, acts (i) through (xi) for each of the remaining radial servo tracks of the plurality of disk surfaces.

7. The method of claim 6, wherein the subset of servo wedges written simultaneously is two.

8. The method of claim 6, wherein the total number of disk surfaces is six.

9. The method of claim 6, wherein the typical disk surface has a servo track density in the range of 30,000 to 40,000 servo tracks per radial inch.

10. The method of claim 6, wherein the number of servo wedges per servo track is 64.

11. A method of writing servo tracks on a hard drive having a plurality of disk surface's and read write heads, wherein each disk surface comprises a plurality of servo tracks at a plurality of radial locations, and wherein a particular servo track set is represented by the variable X, and wherein the typical servo track comprises a plurality of servo wedges, and wherein the servo wedges are grouped so as to define wedge sets, and wherein a particular wedge set is represented by the variable Z, and wherein each wedge set comprises a plurality of subsets, and wherein a subset comprises at least two servo wedges but less than the total number of servo wedges in the corresponding wedge set, and wherein a particular subset is represented by the variable Y, the method comprising:

(i) setting X, Y, and Z to an initial value;

(ii) positioning the heads to the radial location of the $X^{th}$ servo track;

(iii) enabling a plurality of heads to write a $Y^{th}$ subset of the $Z^{th}$ wedge set;

(iv), disabling the plurality of heads previously engaged in act (iii);

(v) incrementing Y to correspond to the next subset of the $Z^{th}$ wedge set;

(vi) repeating, if necessary, acts (iii) through (v) until the $Z^{th}$ wedge set is complete;

(vii) following act (vi) resetting Y equal to the initial value;

(viii) incrementing Z to correspond to the next wedge set;

(ix) repeating, if necessary, acts (iii) through (viii) until the $X^{th}$ servo track is complete;

(x) following act (ix) incrementing X to correspond to the next servo track;

(xi) resetting Y and Z to the initial value; and (xii) repeating, if necessary, acts (ii) through (xi) until the plurality of servo tracks are complete.

12. The method of claim 11, wherein the subset comprises two servo wedges.

13. The method of claim 11, wherein the total number of disk surfaces is six.

14. The method of claim 11, wherein the density of the servo tracks on a typical disk Surface is in the range of 30,000 to 40,000 servo tracks per radial inch of the typical disk surface.

15. The method of claim 11, wherein the number of servo wedges per servo track is 64.

* * * * *